No. 706,389. Patented Aug. 5, 1902.
C. CHRISTENSEN.
MEASURING DEVICE.
(Application filed Dec. 7, 1901.)
(No Model.)
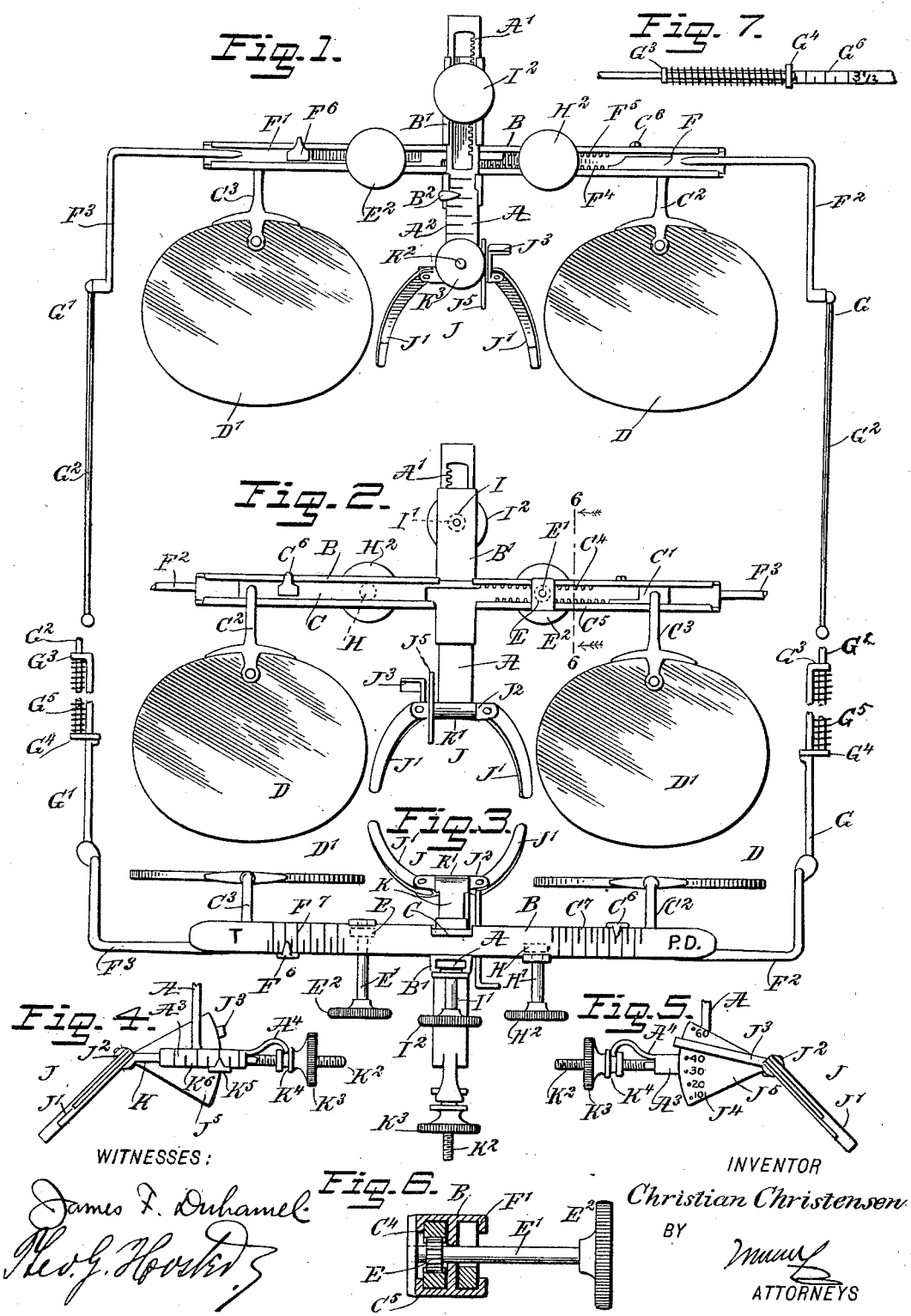

UNITED STATES PATENT OFFICE.

CHRISTIAN CHRISTENSEN, OF ESCANABA, MICHIGAN.

MEASURING DEVICE.

SPECIFICATION forming part of Letters Patent No. 706,389, dated August 5, 1902.

Application filed December 7, 1901. Serial No. 85,008. (No model.)

*To all whom it may concern:*

Be it known that I, CHRISTIAN CHRISTENSEN, a citizen of the United States, and a resident of Escanaba, in the county of Delta and State of Michigan, have invented a new and Improved Measuring Device, of which the following is a full, clear, and exact description.

The object of the invention is to provide a new and improved measuring device, more especially designed for the use of opticians and eye specialists to fit spectacles and eyeglasses by obtaining accurately the necessary measurements—such as pupilary distance, temple distance, height or depth of the nose-angle of the nosepiece, length of the temple, and width at the base of the nose—to insure proper fitting of the eyeglasses or spectacles to the wearer's face.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the figures.

Figure 1 is a front elevation of the improvement. Fig. 2 is a rear view of the same. Fig. 3 is a plan view of the same. Fig. 4 is an enlarged elevation of one side of the mechanism for adjusting the nosepiece. Fig. 5 is a like view of the other side of the same. Fig. 6 is an enlarged transverse section of the improvement on the line 6 6 of Fig. 2, and Fig. 7 is a side elevation of part of the temple.

The improved measuring device is provided with a post A, on which is mounted to slide up and down the sleeve B' of a bar B, forming a double guideway and extending horizontally—that is, at right angles to the post A—and in the front face of said bar is formed a longitudinal bearing for the lens-carriers C C', having depending arms or brackets $C^2$ $C^3$, supporting the lenses D and D'. The lens-carriers C C' are provided with racks $C^4$ $C^5$ (see Figs. 2 and 6) in mesh with opposite sides of a gear-wheel E, secured on a shaft E', journaled in suitable bearings in the bar B and extending transversely, the outer end of the shaft carrying a knob $E^2$, adapted to be taken hold of by the operator to turn the shaft E' and gear-wheel E to impart a longitudinal sliding motion to the lens-carriers C and C', so that the carriers move simultaneously toward or from each other to move the lenses D and D' into proper position relative to the pupilary distance of the eyes. On the carrier C is secured a pointer $C^6$, indicating on a graduation $C^7$, arranged on the top of the bar B, so that the operator can read the pupilary distance to which the lenses have been adjusted.

The bar B is provided in its rear face with a bearing for the temple-carriers F and F', provided at their ends with angular depending arms $F^2$ and $F^3$, on which are pivoted the temples G and G'. The temple-carriers F and F' are provided with racks $F^4$ $F^5$ in mesh with opposite sides of a gear-wheel H, secured on a shaft H', mounted to turn in suitable bearings carried by the bar B, and on the outer end of said shaft H' is secured a knob $H^2$, adapted to be taken hold of by the operator to turn said shaft and its gear-wheel H to move the temple-carriers F and F' simultaneously toward or from each other for obtaining the proper distance between the temples according to the shape of the face of the user. On the temple-carrier F' is secured a pointer $F^6$, indicating on a graduation $F^7$, arranged on the top of the bar B, so that the distance between the two temples can be read by the operator on the graduation $F^7$.

By reference to the drawings it will be seen that the graduations $C^7$ and $F^7$ are located on top of the bar B on opposite sides of the post A, so that the operator is not liable to mistake the graduations.

The bar B and the parts supported and carried thereby are vertically adjustable on the post A, and for this purpose the upper end of the post A is provided with a rack A' in mesh with a gear-wheel I, secured on a shaft I', journaled in suitable bearings carried by the sleeve B', said shaft I' extending transversely and carrying at its outer end a knob $I^2$, adapted to be taken hold of by the operator to turn the shaft I' and its gear-wheel I to cause the gear-wheel to roll on the rack A', so that the bar moves up or down on the post A, according to the direction in which the knob I² is turned. As shown in Fig. 1, the sleeve B' carries a pointer B², which indicates on a graduation A² on the post A.

The saddle or crest J for engagement with the nose is formed with sets of leaves J', hinged on the ends of a pivot J², extending longitudinally and journaled in a bearing K', arranged on one end of a bar K, mounted to slide transversely in a bearing A³, secured to the lower end of the post A. The leaves J' of each set are curved and are made of different lengths to permit of readily fitting the shape of the nose, as the leaves can be swung toward and from each other to fit the sides of the nose. The rear end of the bar K is provided with a screw-rod K², on which screws a nut K³, having an annular groove K⁴, engaged by the forked end of an arm A⁴, extending from the bearing A³, as is plainly illustrated in Figs. 4 and 5. Thus when the operator turns the nut K³ the screw-rod K², and with it the bar K, is moved transversely to bring the saddle or crest J in proper position on the nose. As shown in Fig. 4, the bar K carries a pointer K⁵, which indicates on a graduation K⁶ on the bearing A³. In order to give the desired angle to the saddle or crest J, the latter is swung on its pivot J², and for this purpose said pivot is provided with a rearwardly-extending arm J³, adapted to be taken hold of by the operator and held on a graduation J⁴, formed on a plate J⁵, fixed to the bearing K' of the bar K.

In order to give the desired length to the temple of the spectacles to be fitted, I make the earpiece G² of the temple slidable on the forward end thereof, and for this purpose the earpiece is mounted to slide in a bearing G³, carried on the temple-bar G or G', and the inner end of the earpiece G² is mounted to turn in a bracket G⁴, mounted to slide on the temple-bar and moving with the earpiece. A spring G⁵ is coiled on the earpiece between the bracket G⁴ and the bearing G³, so as to normally hold the earpiece in an innermost position, but to allow the earpiece to slide outward to vary the length of the temple according to the shape of the face of the person on whom the spectacles are to be fitted. The bracket G⁴ indicates on a graduation G⁶, formed on the temple-bar, as is plainly indicated in Fig. 7, so that when the temples are fitted the operator can immediately read the length of the temples on said graduation G⁶.

From the foregoing it will be seen that the nosepiece can be adjusted to fit the sides of the nose, for it can be moved bodily inward or outward to change its position relative to the lenses. It will also be seen that the lenses can be adjusted according to the pupilary distance by moving the bar B up and down and with it the lenses and temples, and the latter can be readily brought into the proper position relative to the height of the eyes. Thus the operator is enabled to obtain the necessary measurements for properly fitting eyeglasses and spectacles to the user according to the shape of his face, especially as to pupilary distance, temple distance, height or depth of nose, angle of nosepiece, length of temple, width at the base of the nose, &c., which measurements can be obtained in a comparatively short time.

Having thus fully described my invention, I claim as new and desire to secure by Letters Patent—

1. A measuring device, comprising a post provided with a longitudinal slot having a rack at one side, a bar having a sleeve mounted to slide up and down on the said post, the said bar being provided with guideways, lens-carriers slidable toward or from each other and lengthwise on the bar, means for sliding the lens-carriers simultaneously temple-carriers slidable toward or from each other and lengthwise on the said bar, means for sliding the temple-carriers simultaneously, an adjustable saddle or crest for the nose supported on said post, and a gear-wheel arranged in the slot in the post and meshing with the rack, the shaft of the gear-wheel being journaled in the said sleeve, as set forth.

2. A measuring device, comprising a post, a bar slidable up and down on the post and provided at the front and rear sides with guideways, lens-carriers mounted in the guideway at one side, and slidable, toward or from each other and lengthwise on the bar, means for sliding the lens-carriers simultaneously temple-carriers mounted in the other guideway and slidable toward or from each other and lengthwise of the bar, means for sliding the temple-carriers simultaneously an adjustable saddle or crest for the nose, supported on said post, and means for setting said saddle at a desired angle, as set forth.

3. A measuring device provided with a bar having a longitudinal guideway formed in one of its faces lens-carriers mounted to slide in said guideway toward or from each other and provided with racks, a gear-wheel in mesh at opposite sides with said racks, and means for turning said gear-wheel to move said lens-carriers simultaneously toward or from each other, as set forth.

4. A measuring device provided with a bar having a longitudinal guideway, temple-carriers mounted to slide in said guideway and provided with racks, adjustable temples carried by said temple-carriers, a gear-wheel in mesh at opposite sides with said racks, and means for turning said gear-wheel for moving said temple-carriers simultaneously toward or from each other, as set forth.

5. A measuring device provided with a bar having a guideway, temple-carriers mounted to slide in said guideway and provided with racks, adjustable temples carried by said temple-carriers, a gear-wheel under the control of the operator and in mesh at opposite sides with said racks for moving said temple-carriers simultaneously toward or from each other, a pointer on one of the temple-carriers and a graduation on said bar on which the pointer indicates, as set forth.

6. A measuring device, comprising a post, a bar slidable up and down on the post and provided on its front and rear faces with longitudinal guideways, lens-carriers mounted in the guideway on one face of the bar and slidable toward or from each other, temple-carriers mounted in the other guideway and slidable simultaneously toward or from each other, means for sliding the temple-carriers simultaneously, an adjustable saddle or crest for the nose supported on said post, means for setting said saddle at a desired angle, a pointer on one of the lens-carriers, and a graduation on the said bar on which said pointer indicates to give the pupilary distance of the eyes, as set forth.

7. A measuring device, comprising a post, a bar mounted to slide on said post and having guideways, lens and temple carriers supported in said guideways, means for moving said bar up and down on said post, a pointer moving with said bar, a graduation on said post on which the pointer indicates, a saddle, a bar in which the saddle is pivoted, the said bar being adjustable transversely in a bearing at the lower end of the post, means for turning said saddle on its pivot, and means for adjusting said bar transversely, as set forth.

8. A measuring device, comprising a post, a bar provided with a sleeve mounted to slide on said post, the said bar having guideways in its front and rear faces, lens and temple carriers mounted to slide in said guideways, means for moving the bar up and down on said post, a pointer moving with said bar, a graduation on said post on which the pointer indicates, a saddle a bar in which the saddle is pivoted, the said bar being adjustable transversely in a bearing at the lower end of the post, means for turning said saddle on its pivot means for adjusting the bar carrying the saddle transversely, a pointer carried by said bar, and a graduation on the bearing in which the bar is mounted, for indicating the distance said bar and saddle are moved as set forth.

9. A measuring device provided with a post having a bearing at its lower end, a bar mounted to slide transversely in said bearing, a saddle having a pivot mounted to turn in said bar, saddle-leaves hinged on said pivot, the said bar being provided at its rear end with a screw-rod, a nut screwing on said screw-rod and having an annular groove, and an arm extending from the bearing for said bar, and having a forked end engaging the groove in the said nut, as set forth.

10. A measuring device provided with a saddle having sets of hinged leaves, a bar having a bearing at one end, a pivot on which the leaves are hinged the pivot being journaled in said bearing, an arm on said pivot for turning the latter and a plate on said bearing and provided with a graduation on which the arm indicates, as set forth.

11. A measuring device having a post provided with a bearing at its lower end, a bar mounted to slide transversely in said bearing and having a bearing at one end, a saddle provided with a longitudinally-extending pivot journaled in the latter bearing, and leaves pivoted on the ends of said pivot and of different lengths, as set forth.

12. A measuring device provided with a bar having a longitudinal guideway, temple-carriers mounted to slide in said guideway and provided with racks, each temple-carrier having an angular depending arm, a temple-bar pivoted on said arm and having a spring-pressed earpiece mounted to slide in a bearing on the temple-bar, a bracket mounted to slide on the temple-bar and moving with the earpiece and in which the inner end of the earpiece is mounted to turn, means for indicating the length of the temple, and comprising a graduation formed on the temple-bar and on which the bracket indicates, and a gear-wheel in mesh at opposite sides with the racks on the temple-carriers, as set forth.

13. A measuring device, comprising a post, a bar slidable up and down on the post and provided with guideways, lens and temple carriers slidable in said guideways and provided with racks, pinions meshing at opposite sides with the racks of the lens and temple carriers respectively, and a saddle or crest for the nose supported on said post, as set forth.

14. A measuring device provided with a horizontally-arranged bar having a guideway, lens-carriers mounted to slide in said guideway and having depending arms or brackets supporting the lenses, the lens-carriers being provided with racks, a gear-wheel under the control of the operator and in mesh at opposite sides with said racks for moving said lens-carriers simultaneously toward or from each other, and a pointer on one of the lens-carriers, and indicating on a graduation on the said bar, as set forth.

In testimony whereof I have signed my name to this specification in the presence of two subscribing witnesses.

CHRISTIAN CHRISTENSEN.

Witnesses:
ALLIE CHRISTENSEN,
WM. J. SCHIES.